（12）United States Patent
Wilcox et al.

(10) Patent No.: US 12,030,451 B2
(45) Date of Patent: Jul. 9, 2024

(54) SUPPORT BAR MOUNTED SYSTEM AND METHOD OF MINIMUM CLOSE INDICATION FOR RIDE VEHICLE

(71) Applicant: UNIVERSAL CITY STUDIOS LLC, Universal City, CA (US)

(72) Inventors: Rachel Sarah Wilcox, League City, TX (US); James Anthony Bertoncello, Orlando, FL (US); Michael David Russell, Jr., Orlando, FL (US); Shawn Michael Kish, Apopka, FL (US)

(73) Assignee: Universal City Studios LLC, Universal City, CA (US)

( * ) Notice: Subject to any disclaimer, the term of this patent is extended or adjusted under 35 U.S.C. 154(b) by 700 days.

(21) Appl. No.: 17/316,583

(22) Filed: May 10, 2021

(65) Prior Publication Data
US 2021/0354646 A1    Nov. 18, 2021

Related U.S. Application Data

(60) Provisional application No. 63/023,413, filed on May 12, 2020.

(51) Int. Cl.
*B60R 21/02* (2006.01)
*A63G 31/00* (2006.01)
*B60R 21/00* (2006.01)

(52) U.S. Cl.
CPC ............. *B60R 21/02* (2013.01); *A63G 31/00* (2013.01); *B60R 2021/0097* (2013.01); *B60R 2021/022* (2013.01)

(58) Field of Classification Search
CPC ............ B60R 2021/0097; B60R 21/02; B60R 2021/022; B60R 2022/4816; A63G 7/00; A63G 31/00
See application file for complete search history.

(56) References Cited

U.S. PATENT DOCUMENTS 5,489,212 A * 2/1996 Yoshimoto .............. B60R 22/03
434/45
5,884,563 A * 3/1999 Sheldon .................... A61G 3/02
104/53

(Continued)

FOREIGN PATENT DOCUMENTS

EP          3493115 A1    6/2019
WO     2006098832 A2    9/2006

OTHER PUBLICATIONS

International Search Report and Written Opinion, PCT/2021/031845, Aug. 10, 2021, 8 pgs.

*Primary Examiner* — Zachary L Kuhfuss
*Assistant Examiner* — Cheng Lin
(74) *Attorney, Agent, or Firm* — LOZA & LOZA, LLP; Lew Edward V. Macapagal

(57) ABSTRACT

Aspects of the disclosure relate to a method, apparatus, and system for restraining a passenger in a ride vehicle. The system includes a ride seat and a restraint system configured to restrain the passenger against the ride seat. The restraint system includes a crossbar for placing against the passenger, a support bar having a first support bar end coupled to the crossbar and a second support bar end rotatably coupled to a pivot mounted to an upper-rear portion of the ride seat, and a flap coupled to the support bar. The flap is configured to insert into, or extract from, a slot formed within a seat side structure when the support bar is rotated about the pivot and indicate whether the crossbar has attained a minimum closed position for restraining the passenger based on a position of a marking on the flap relative to the slot.

20 Claims, 8 Drawing Sheets

(56) References Cited

U.S. PATENT DOCUMENTS

| | | | |
|---|---|---|---|
| 7,204,559 B2* | 4/2007 | Berra | B60R 21/02 |
| | | | 297/487 |
| 7,905,789 B2 | 3/2011 | Collins et al. | |
| 9,914,428 B2* | 3/2018 | Zamperla | B60R 21/00 |
| 11,110,877 B2* | 9/2021 | Caelen | A63G 7/00 |
| 11,628,798 B2* | 4/2023 | Sornik | B60R 22/04 |
| | | | 297/477 |
| 2004/0032157 A1* | 2/2004 | Trimborn | A63G 7/00 |
| | | | 297/484 |
| 2006/0202542 A1* | 9/2006 | Pribonic | B60R 21/00 |
| | | | 297/467 |
| 2007/0182534 A1 | 8/2007 | Gregory | |
| 2012/0068521 A1* | 3/2012 | Roodenburg | B60R 21/026 |
| | | | 297/487 |
| 2015/0232059 A1 | 8/2015 | Zamperla | |
| 2017/0080887 A1* | 3/2017 | Evans | B60N 2/4242 |
| 2018/0312173 A1* | 11/2018 | Hall | B60R 22/48 |

* cited by examiner

SUPPORT BAR MOUNTED SYSTEM AND METHOD OF MINIMUM CLOSE INDICATION FOR RIDE VEHICLE

CROSS-REFERENCE TO RELATED APPLICATION

This application claims priority to and the benefit of U.S. Provisional Application Ser. No. 63/023,413 entitled "SUPPORT BAR MOUNTED SYSTEM AND METHOD OF MINIMUM CLOSE INDICATION FOR RIDE VEHICLE" filed on May 12, 2020, the entire contents of which is incorporated herein by reference as if fully set forth below in its entirety and for all applicable purposes.

TECHNICAL FIELD

The technology discussed below relates generally to amusement park rides, and more particularly, to a system and method for indicating a minimum closed position of a restraint system to determine whether a passenger is safely restrained in a ride vehicle.

INTRODUCTION

Restraint systems are used to safely restrain passengers in amusement park ride vehicles. For example, a restraint system is provided to contain a seated, standing, or prone passenger. With seated rides, a restraint system may take the form of a crossbar (e.g., lap bar, T-bar, etc.) placed against the torso or thighs of the passenger. In an example, the crossbar may be supported by one or more support bars rotatably coupled to a pivot mounted at or near a ride vehicle floor in close proximity to the passenger's legs. As such, the crossbar may move toward or away from the passenger as the one or more support bars are caused to rotate about the pivot toward or away from the passenger.

In general, the restraint system allows for the crossbar to be pulled toward the passenger to any relative position, but is restricted from being pushed in the opposite direction until the bar is unlocked by operating personnel. Failure to secure the crossbar in a position close enough to the passenger and the seat may create a situation whereby the passenger's body can move past the crossbar, and thus not be restrained. Therefore, it is important to the safety of the passenger that the crossbar be placed in a position determined to represent a minimum safe operating position.

For some restraint systems, ride operators require some type of minimum closed position indication to ensure that a passenger is restrained properly within the ride vehicle, e.g., that the minimum safe operating position of a crossbar restraint has been attained. With most ride vehicles, a physical indicator can be easily mounted to a hood or ride vehicle floor, and/or mounted electrically, allowing a ride operator to determine if the passenger is properly restrained. However, for ride vehicles without a hood or ride vehicle floor, or for ride vehicles that minimize electrical connections, mounting a non-electrical minimum closed position indicator may be difficult, particularly if only a limited number of ride vehicle surfaces (e.g., seat back, seat pan, and/or restraint system) are available for mounting the indicator. Accordingly, there is a need for a system and method for mounting a non-electrical minimum closed position indicator on a ride vehicle having a limited number of available mounting surfaces that allows a ride operator to quickly and safely determine whether a restraint system is at a minimum safe operating position.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the disclosure relate to a method, apparatus, and system for restraining a passenger in a ride vehicle. The system includes a ride seat and a restraint system configured to restrain the passenger against the ride seat. The restraint system includes a crossbar for placing against the passenger, a support bar having a first support bar end coupled to the crossbar and a second support bar end rotatably coupled to a pivot mounted to an upper-rear portion of the ride seat, and a flap coupled to the support bar. The flap is configured to insert into, or extract from, a slot formed within a side structure of the ride seat when the support bar is rotated about the pivot and indicate whether the crossbar has attained a minimum closed position for restraining the passenger based on a position of a marking on the flap relative to the slot.

In one example, a system for restraining a passenger in a ride vehicle is disclosed. The system includes a ride seat disposed within a ride vehicle. The ride seat includes a seat pan, a seat back, and a side structure formed between the seat pan and the seat back. The system further includes a restraint system configured to restrain a passenger against at least one of the seat back or the seat pan. The restraint system includes a crossbar configured to be placed against the passenger, at least one support bar having a first support bar end coupled to the crossbar and a second support bar end rotatably coupled to a pivot mounted to an upper-rear portion of the ride seat, and a flap coupled to the at least one support bar. The flap extends in a perpendicular manner relative to an orientation of the at least one support bar. Moreover, the flap is configured to insert into, or extract from, a slot formed within an upper portion of the side structure when the at least one support bar is rotated about the pivot, and indicate whether the crossbar has attained a minimum closed position for restraining the passenger based on a position of a marking on the flap relative to the slot. The system also includes at least one rotation adapter coupled to the second support bar end of the at least one support bar. The at least one rotation adapter is configured to rotatably couple the second support bar end to the pivot. The system also includes at least one hydraulic cylinder coupled to the at least one rotation adapter. The at least one hydraulic cylinder is configured to actuate the at least one rotation adapter to rotate the at least one support bar about the pivot causing the crossbar to move toward or away from the passenger.

In one example, a method for restraining a passenger in a ride vehicle is disclosed. The method includes disposing a ride seat within a ride vehicle. The ride seat includes a seat pan, a seat back, and a side structure formed between the seat pan and the seat back. The method further includes restraining a passenger against at least one of the seat back or the seat pan. The restraining includes rotating at least one support bar about a pivot mounted to an upper-rear portion of the ride seat. The at least one support bar includes a first support bar end coupled to a crossbar to be placed against the passenger and a second support bar end rotatably coupled to the pivot. The rotating of the at least one support bar about the pivot causes the crossbar to move toward or away from the passenger. The restraining also includes inserting a flap coupled to the at least one support bar into, or extracting the flap from, a slot formed within an upper portion of the side structure when the at least one support bar is rotated about the pivot. The method also includes indicating whether the crossbar has attained a minimum closed position for restraining the passenger based on a position of a marking on the flap relative to the slot, and indicating whether the crossbar is beyond a maximum closed position for restraining the passenger based on a position of a second marking on the flap relative to the slot.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and/or packaging arrangements.

Aspects of the present disclosure are related to amusement park ride vehicles, such as automated guide vehicles used for entertainment purposes. Specifically, aspects of the present disclosure relate to ride vehicle restraint systems, and more particularly, to a system and method for indicating a minimum closed position of a restraint system to determine whether a rider/passenger is safely restrained in a ride vehicle. In an aspect, a visual indicator for indicating the minimum closed position of the restraint system is mounted in a non-electrical manner on a ride vehicle having a limited number of available mounting surfaces.

Figure 1:
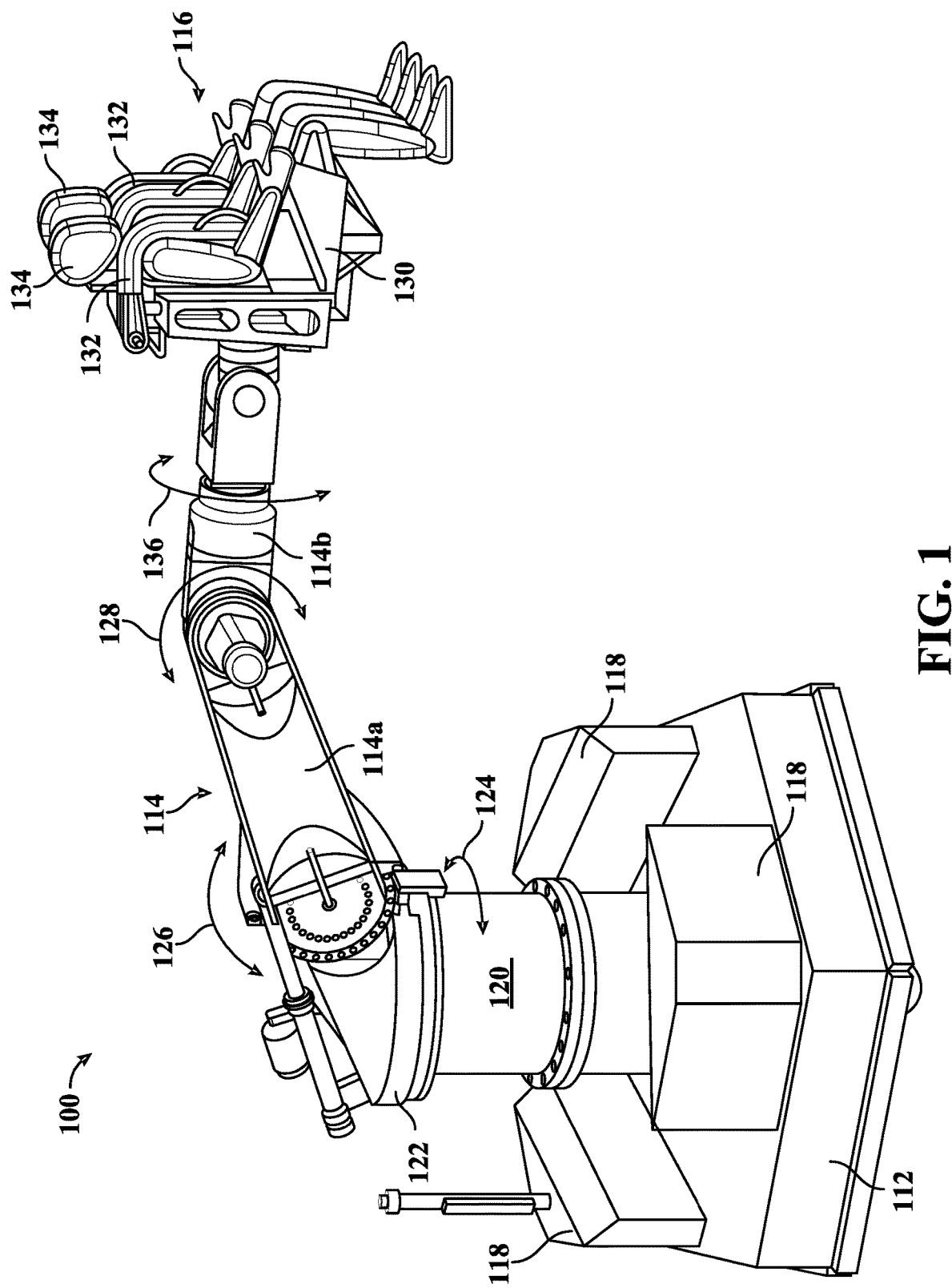
FIG. 1 shows a perspective view of an example of a passenger-carrying ride vehicle.

Amusement parks may use passenger-carrying ride vehicles to provide an immersive entertainment experience to a park guest. FIG. 1 shows a perspective view of an example of a passenger-carrying ride vehicle 100. The ride vehicle 100 may include a base 112 and an arm 114. As shown, the configuration of the ride vehicle 100 is merely an example and is not intended to be limiting. The base 112 may include a number of drive units 118 that enable the ride vehicle 100 to follow an intended path. The base 112 may further include a central pillar 120 to which a turntable 122 of the arm 114 is rotatably mounted. The arm 114 may include a lower arm portion 114a and an upper arm portion 114b which are pivotably connected to one another. The lower arm portion 114a is further pivotably connected to the turntable 122. Together, the pivotable connection between the lower arm portion 114a and the upper arm portion 114b, the pivotable connection between the lower arm portion 114a and the turntable 122, and the rotatable connection between the arm 114 and the central pillar 120, enable the arm 114 to move in a plurality of directions as indicated by arrows 124, 126, and 128.

The ride vehicle 100 may further include a passenger carrier 116. The passenger carrier 116 includes a number of ride seats 130 mounted in a side by side orientation. As shown in FIG. 1, the passenger carrier 116 is provided with two seats 130 as an example but is not intended to be limiting as the passenger carrier 116 may support additional seats (e.g., a total of four seats). Each seat 130 is provided with a restraint system 132 configured to ensure that a rider/passenger 134 remain in the seat 130 when the passenger carrier 116 is moved by the arm 114 and further when the arm 114 and the passenger carrier 116 are moved by the base 112. The passenger carrier 116 is pivotably connected to the upper arm portion 114b and is movable relative to the arm 114 as indicated by arrow 136.

It will be appreciated that the passenger carrying arrangement of the ride vehicle 100 described above is illustrative of one of many different passenger carrying arrangements that may be utilized by the ride vehicle 100 for entertainment purposes. In one example arrangement, the seats 130 may be mounted to the base 112 of the ride vehicle 100 and the arm 114 omitted.

A passenger-carrying ride vehicle 100 of the type described above is typically used in amusement parks to provide park guests with an immersive entertainment experience. The ride vehicle may move through a themed environment relating to, for example, a film or video game. The themed environment may include elements, such as scenery, props, animated figures, audio effects, visual effects, pyrotechnic effects, and olfactory effects, for example. As the ride vehicle 100 moves through the themed environment, the vehicle's movement, as well as the movement of the arm 114 and the passenger carrier 116, is synchronized with the themed environment elements to provide the immersive entertainment experience. As will be described in greater detail below, because it is important that the rider/passenger be safely restrained in the ride vehicle, a system and method for indicating a minimum closed position of a restraint system is provided to determine whether the rider/passenger is indeed safely restrained.

Figure 2:
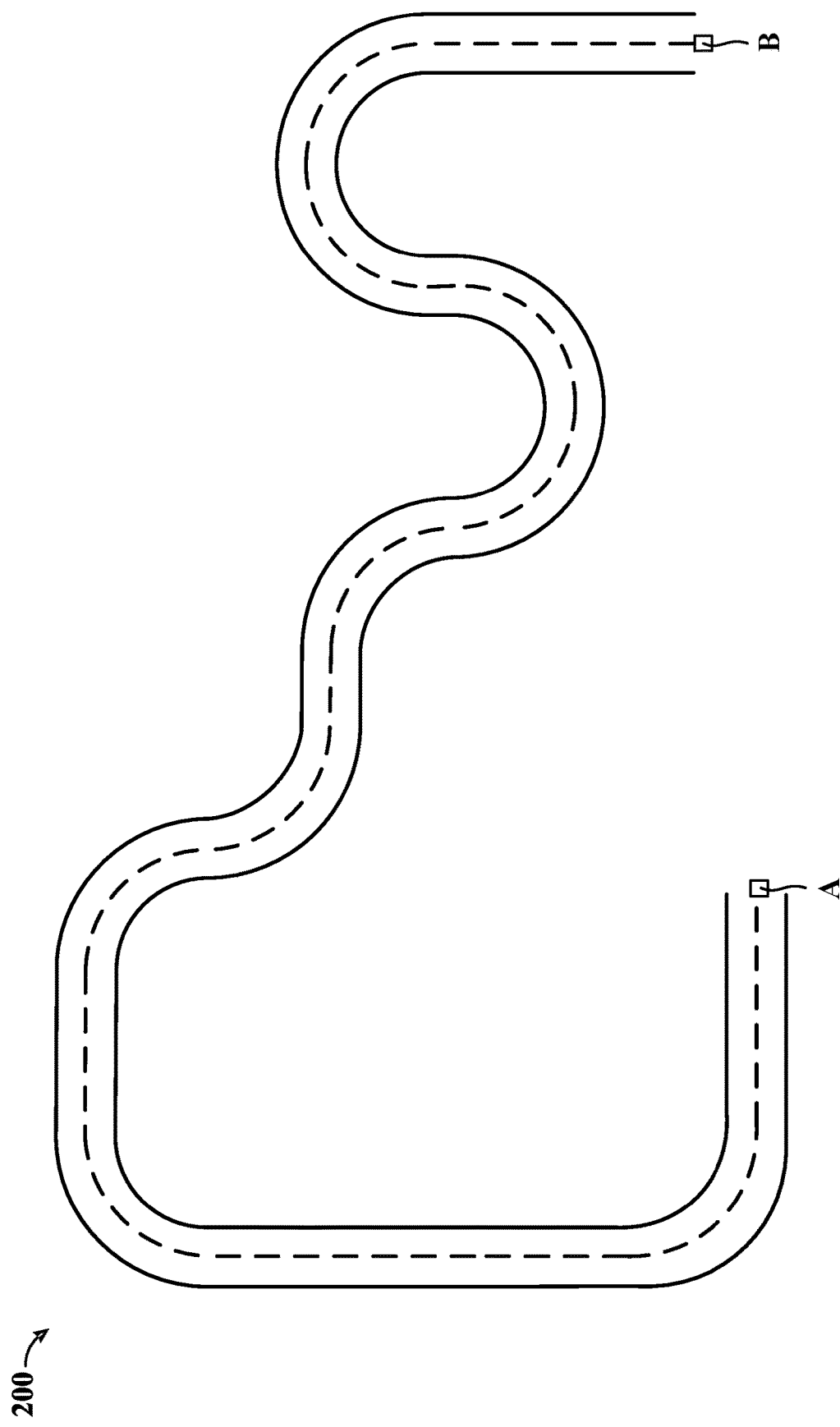
FIG. 2 shows a schematic view of an example of a travel path for a ride vehicle.

FIG. 2 shows a schematic view of an example of a travel path 200 for a ride vehicle (e.g. ride vehicle 100). The travel path 200 has a start point A and an end point B and extends in a sinuous manner between the start point A and the end point B. In some aspects, the travel path 200 may be in the form of a closed loop such that the ride vehicle circulates around the travel path 200. The start point A may be defined by a passenger embarkation point of the path 200, whereas the end point B may be defined by a passenger disembarkation point of the path 200.

In an aspect, the ride vehicle may be configured to travel for a portion of the path 200 between the start point A and the end point B at a steady rate. At predetermined points along the travel path 200, the ride vehicle may undertake a dynamic movement operation. Such dynamic movement operation may include, for example, lateral translation movements, spins, helical spins, slides in or contrary to the direction of movement of the ride vehicle, periods of rapid acceleration and deceleration, transitions into reverse, sharp turns, or combinations thereof.

In order to provide a ride vehicle passenger with the desired immersive entertainment experience, the movement of the ride vehicle base 112, arm 114, and passenger carrier 116 are synchronized closely with the aforementioned elements of the themed environment. It is thus important that the passenger be safely restrained in the seat 130 so that the passenger is prevented from being ejected from the seat 130 (e.g., past a restraint system) due to the dynamic movement operation of the ride vehicle 100.

Figure 3:
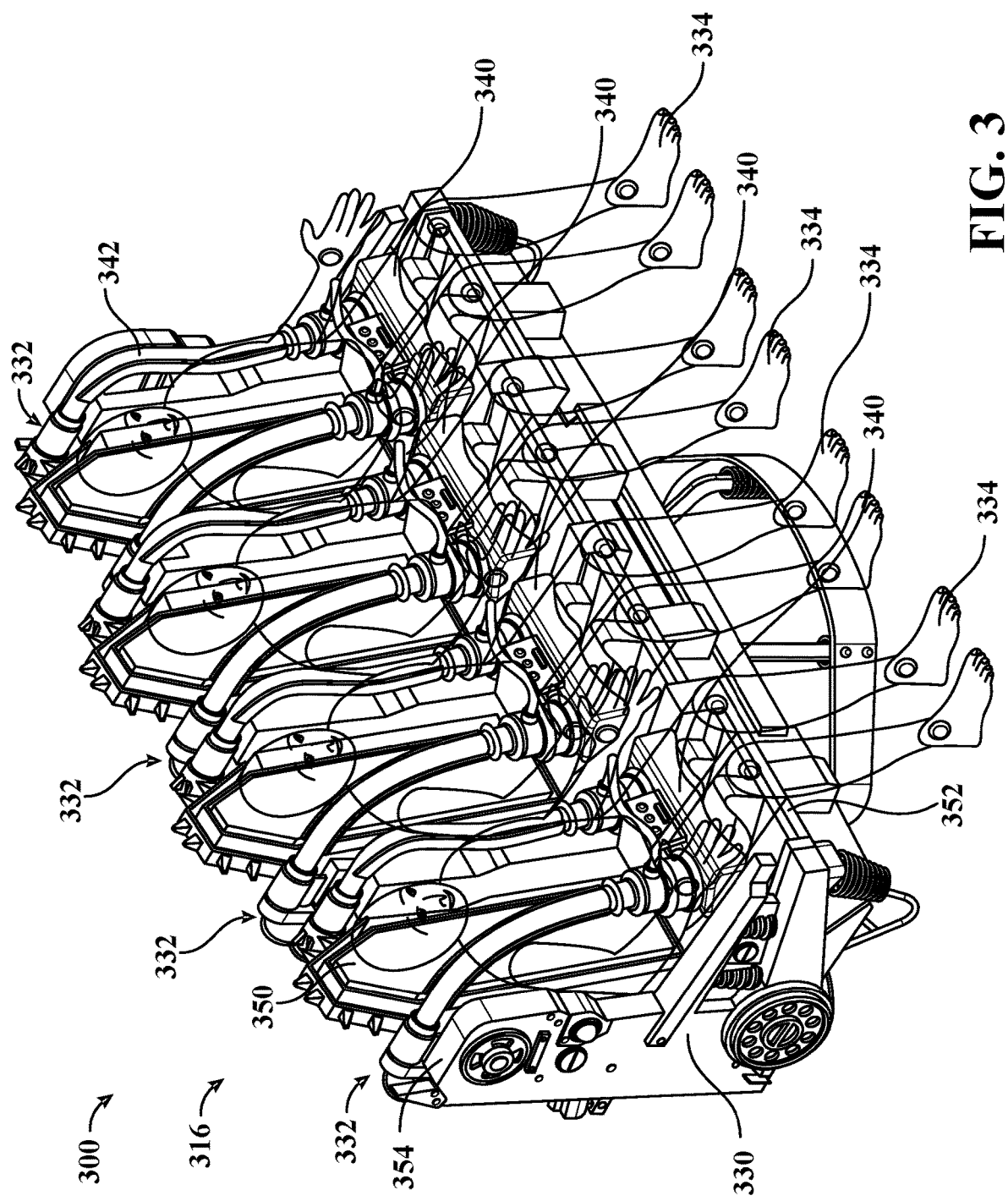
FIG. 3 is a diagram showing a front perspective view of a passenger carrier according to an aspect of the present disclosure.
Figure 4:
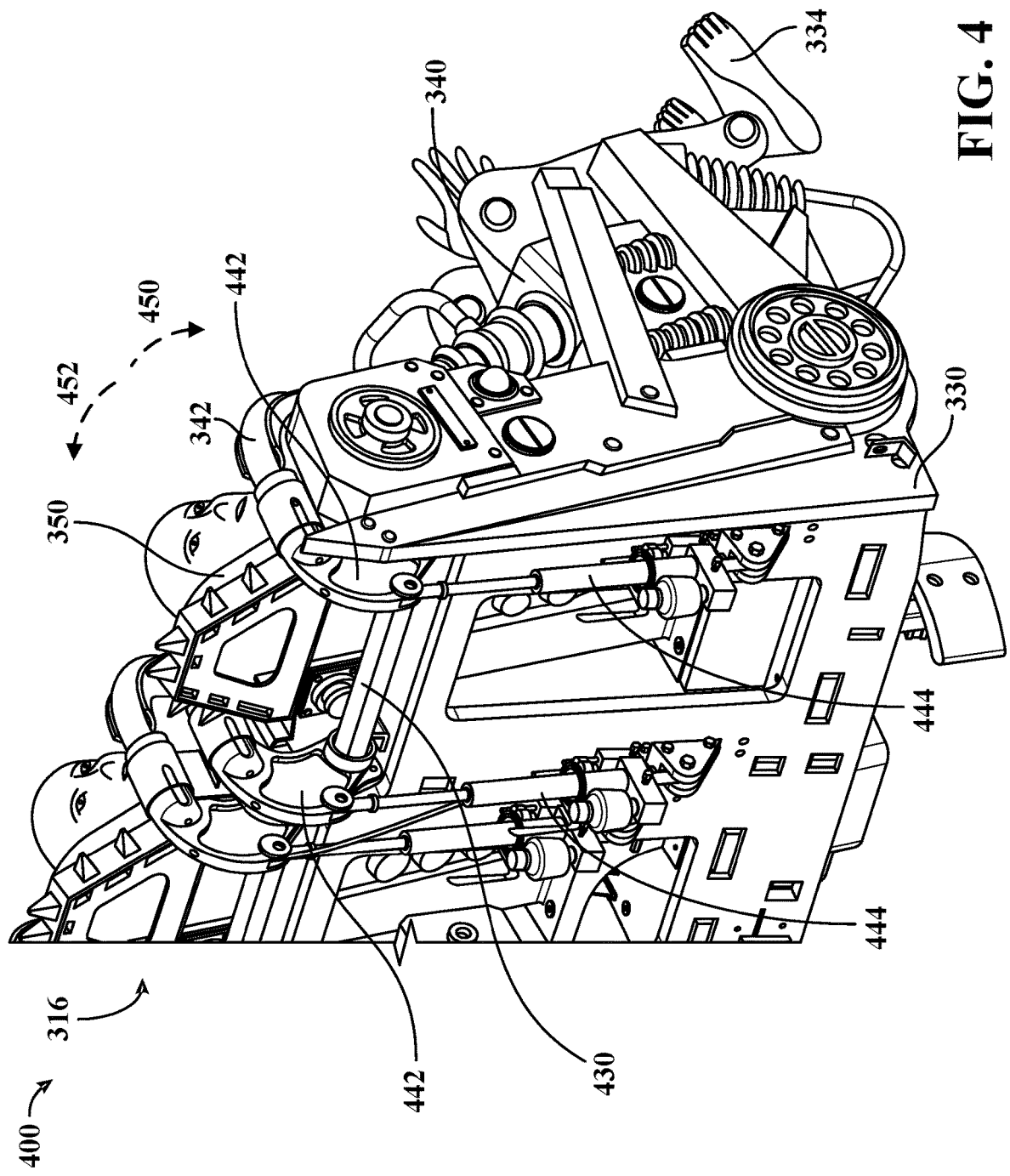
FIG. 4 is a diagram showing a rear perspective view of a passenger carrier according to an aspect of the present disclosure.

FIG. 3 is a diagram 300 showing a front perspective view of a passenger carrier 316 according to an aspect of the present disclosure. FIG. 4 is a diagram 400 showing a rear perspective view of a passenger carrier 316 according to an aspect of the present disclosure. The passenger carrier 316 may be equivalent to the passenger carrier 116 shown in FIG. 1, and may therefore, be coupled to the arm 114 of the ride vehicle 100. Moreover, the passenger carrier 316 shown in FIG. 3 is provided with four seats 330 as an example but is not intended to be limiting as the passenger carrier 316 may support more or less seats.

In an aspect, each seat 330 may include a seat back 350, a seat pan 352, and one or more side structures 354 formed between the seat back 350 and the seat pan 352. Moreover, each seat 330 is provided with a restraint system 332 configured to restrain the rider/passenger 334 within the seat 330 (e.g., against the seat back 350 and/or the seat pan 352) when the passenger carrier 316 is moved by the arm 114 and/or the base 112 of the ride vehicle 100. The restraint system 332 may include a crossbar 340 (e.g., lap bar, T-bar, etc.) to be placed against the torso or thighs of the rider/passenger 334. In an aspect, the crossbar 340 may be made of a rigid material, a soft material (e.g. foam pad), or a combination thereof. The restraint system 332 further includes one or more support bars 342 (e.g., restraint tubes) onto which the crossbar 340 is attached. In particular, a support bar 342 has a first support bar end coupled to the crossbar 340 and a second support bar end rotatably coupled to a pivot 430 (shown in FIG. 4). The pivot 430 may be mounted to an upper-rear portion of the seat 330 behind the seat back 350 proximate to the passenger's head and shoulders.

As shown in FIG. 4, the restraint system 332 also includes one or more rotation adapters 442 and one or more hydraulic cylinders 444. Each support bar 342 is attached to a respective rotation adapter 442, which is mounted to the pivot 430. In an aspect, a rotation adapter 442 may be considered as part of a support bar 342. Each rotation adapter 442 is engaged to a respective hydraulic cylinder 444. As such, when activated, the one or more hydraulic cylinders 444 actuate the one or more rotation adapters 442 to rotate the one or more support bars 342 about the pivot 430, and thereby, cause the crossbar 340 to move/rotate in a downward direction 450 toward, or an upward direction 452 away from, the torso/thighs of the passenger 334 as the one or more support bars 342 rotate. In an aspect, the passenger carrier 316 may include one hydraulic cylinder 444 for each rotation adapter 442 onto which a support bar 342 is attached. Accordingly, for each seat 330 having one crossbar 340 attached to two support bars 342 respectively coupled to two rotation adapters 442, two hydraulic cylinders 444 may be provided to respectively rotate the two support bars 342 about the pivot 430.

An effectiveness of the restraint system 332 may be limited by an ability to place the crossbar 340 at a position in close enough proximity to the seat back 350 and/or the seat pan 352 to prevent the rider/passenger 334 from being ejected past the crossbar 340 by ride induced forces. In an aspect, the restraint system 332 allows for the crossbar 340 to be pulled toward the rider/passenger 334 to any relative position, but is restricted from being pushed in the opposite direction until the crossbar 340 is unlocked by operating personnel. Failure to secure the crossbar 340 in a position close enough to the rider/passenger 334 and the seat back 350/seat pan 352 may create a situation whereby the passenger's body can move past the crossbar 340, and thus not be restrained. This may be the case for passengers with particular body types that the seat 330 may not safely accommodate (e.g., bodies that are particularly small, large, short, or tall) or when the restraint system 332 is not properly working (e.g., locking mechanism broken, disabled, etc.). Therefore, it is important to the safety of the passengers that the crossbar 340 be placed in a position determined to represent a minimum safe operating position. Aspects of the present disclosure relate to indicating a minimum closed position of the restraint system 332 so that a ride operator can ensure that the rider/passenger 334 is restrained properly within seat 330, i.e., that the minimum safe operating position of the crossbar 340 has been attained.

Figure 5:
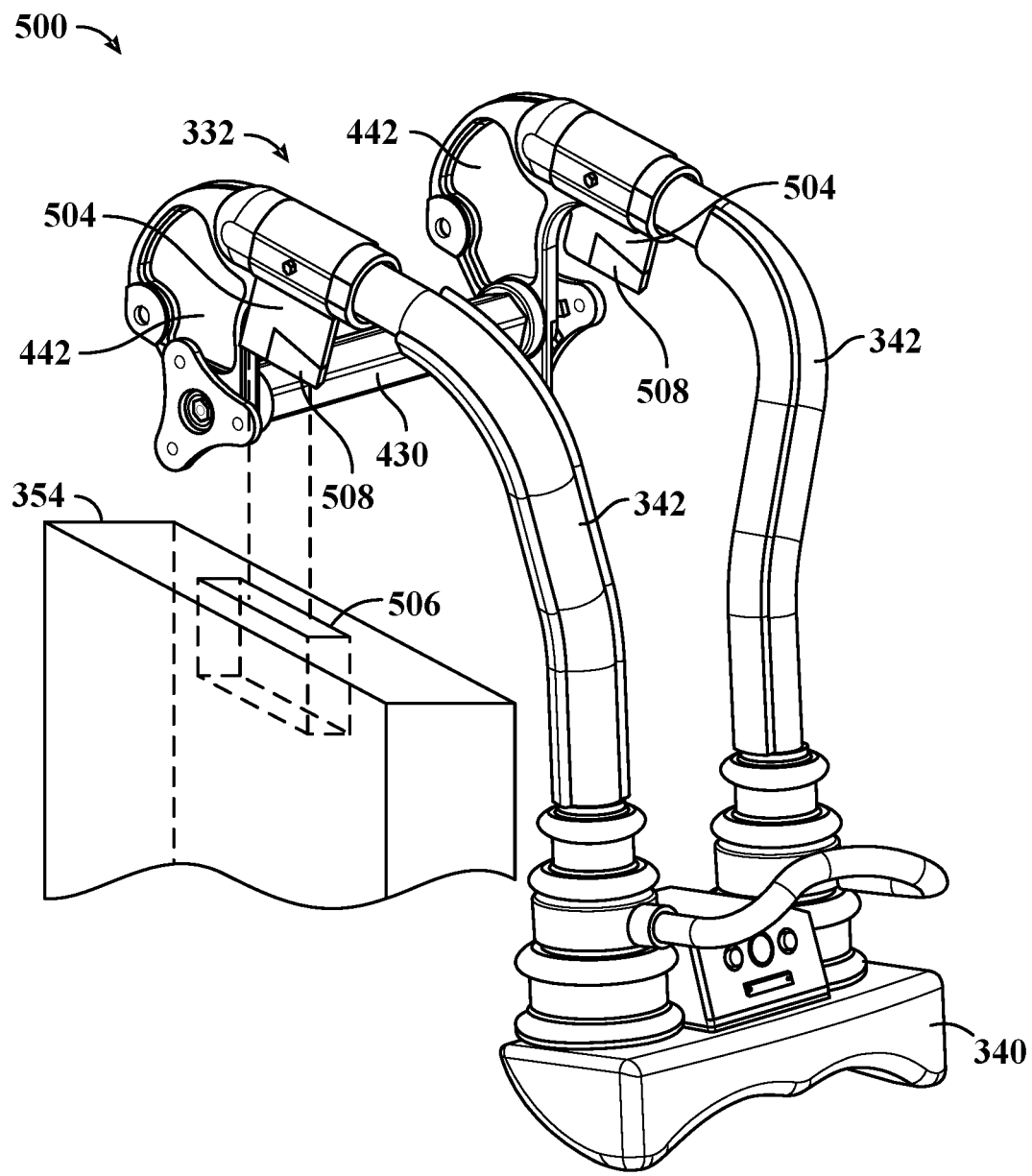
FIG. 5 is a diagram showing a perspective view of a portion of a restraint system according to an aspect of the present disclosure.

FIG. 5 is a diagram 500 showing a perspective view of a portion of a restraint system 332 according to an aspect of the present disclosure. As shown in FIG. 5, the restraint system 332, as described above, further includes a minimum closed position indicator (or flap) 504 coupled to (e.g., bonded or bolted onto) the rotation adapter 442 and/or the support bar 342. The flap 504 extends in a perpendicular manner relative to an orientation of the rotation adapter 442 and/or the support bar 342. Moreover, the flap 504 may be formed of a metal or any other rigid material that will maintain its form as the flap 504 is utilized (e.g., inserted into or extracted from a slot).

In an aspect, an upper side portion of the seat 330 (e.g., upper portion of side structure 354) includes a slot 506 for receiving the flap 504. Accordingly, when a hydraulic cylinder 444 actuates a rotation adapter 442 to cause a support bar 342 to rotate about the pivot 430 (and cause the crossbar 340 to move in a downward direction 450 or upward direction 452), the flap 504 also rotates/moves with the support bar 342 to be inserted into, or extracted from, the slot 506. In an aspect, a lower portion of the flap 504 is denoted by a marking 508 that is visually different from the rest of the flap 504 (i.e., a portion of the flap not occupied by the marking 508). For example, the marking 508 may be a particular color (e.g., red color) while the rest of the flap 504 is a different color (e.g., green color). In another example, the marking 508 may be a pattern of various lines and/or shapes while the rest of the flap 504 is a solid pattern, or vice versa. Notably, the above examples for differentiating the marking 508 from the rest of the flap 504 is not intended to be limiting as any other method for visually segregating the flap portions may be implemented.

Figure 6:
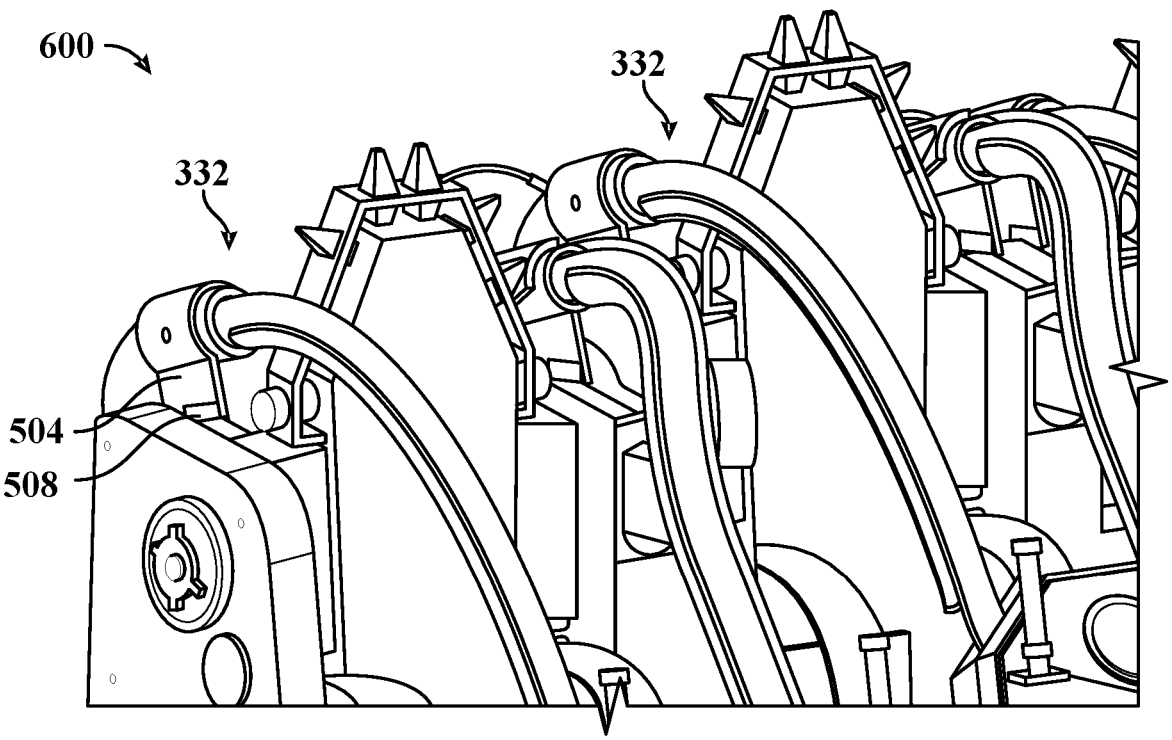
FIG. 6 shows a first diagram depicting a restraint system failing to attain a minimum closed position and a second diagram depicting a restraint system attaining a minimum closed position according to an aspect of the present disclosure.
Figure 6:
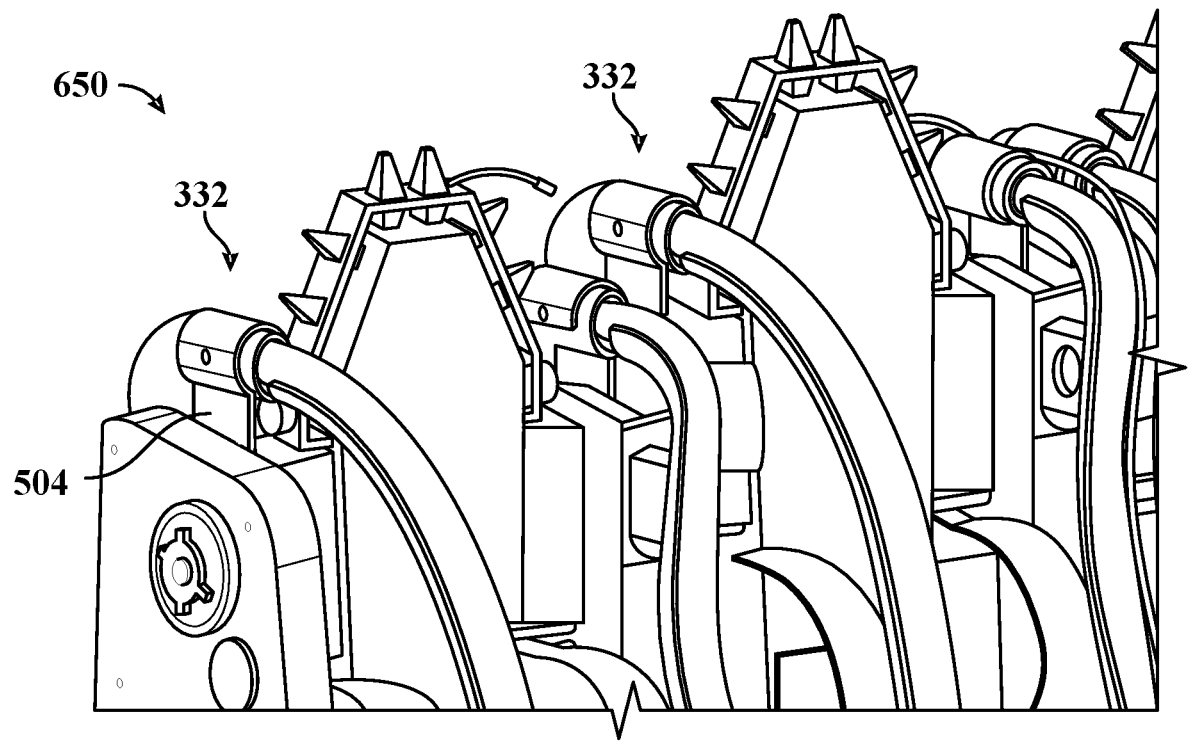

FIG. 6 shows a first diagram 600 depicting a restraint system 332 failing to attain a minimum closed position and a second diagram 650 depicting a restraint system 332 attaining a minimum closed position according to an aspect of the present disclosure. In an aspect, a location of the marking 508 and/or an amount of space occupied by the marking 508 on the flap 504 is predetermined based on a minimum safe operating position/minimum closed position of the crossbar 340 for safely restraining the passenger 334 (e.g., safely preventing the passenger 334 from being ejected past the crossbar 340 by ride induced forces) when the crossbar 340 is engaged to the torso/thighs of the passenger 334. When the crossbar 340 is lowered onto the passenger 334 and the flap 504 is inserted into the slot 506, the flap 504 may indicate whether the restraint system 332/crossbar 340 is minimally closed to safely restrain the passenger 334 according to a position of the marking 508 relative to the slot 506.

For example, referring to the first diagram 600 of FIG. 6, if any portion of the marking 508 is exposed outside of the slot 506 (e.g., marking 508 is visible to a ride operator), then the flap 504 indicates that the restraint system 332 has failed to attain minimum closure and/or a minimum safe operating position. The ride operator, upon seeing the visual indication that the minimum closure has not been attained (e.g., seeing the marking 508), may quickly determine that the passenger 334 is not of a body type that may be safely accommodated in the seat 330/passenger carrier 316 (e.g., the passenger 334 is too large to safely ride) or that the restraint system 332 is not properly working, and prevent the passenger 334 from riding in the ride vehicle. Alternatively, referring to the second diagram 650 of FIG. 6, if no portion of the marking 508 is exposed outside of the slot 506 (e.g., an entirety of the marking 508 is inserted in the slot 506 such that the marking 508 is not visible to the ride operator), then the flap 504 indicates that the restraint system 332 has attained minimum closure and/or a minimum safe operating position. The ride operator, upon seeing the visual indication that the minimum closure has been attained (e.g., the marking 508 is completely in the slot 506 and not visible), may quickly determine that the passenger 334 is of a body type that may be safely accommodated in the seat 330/passenger carrier 316 and allow the passenger 334 to ride in the ride vehicle.

Figure 7:
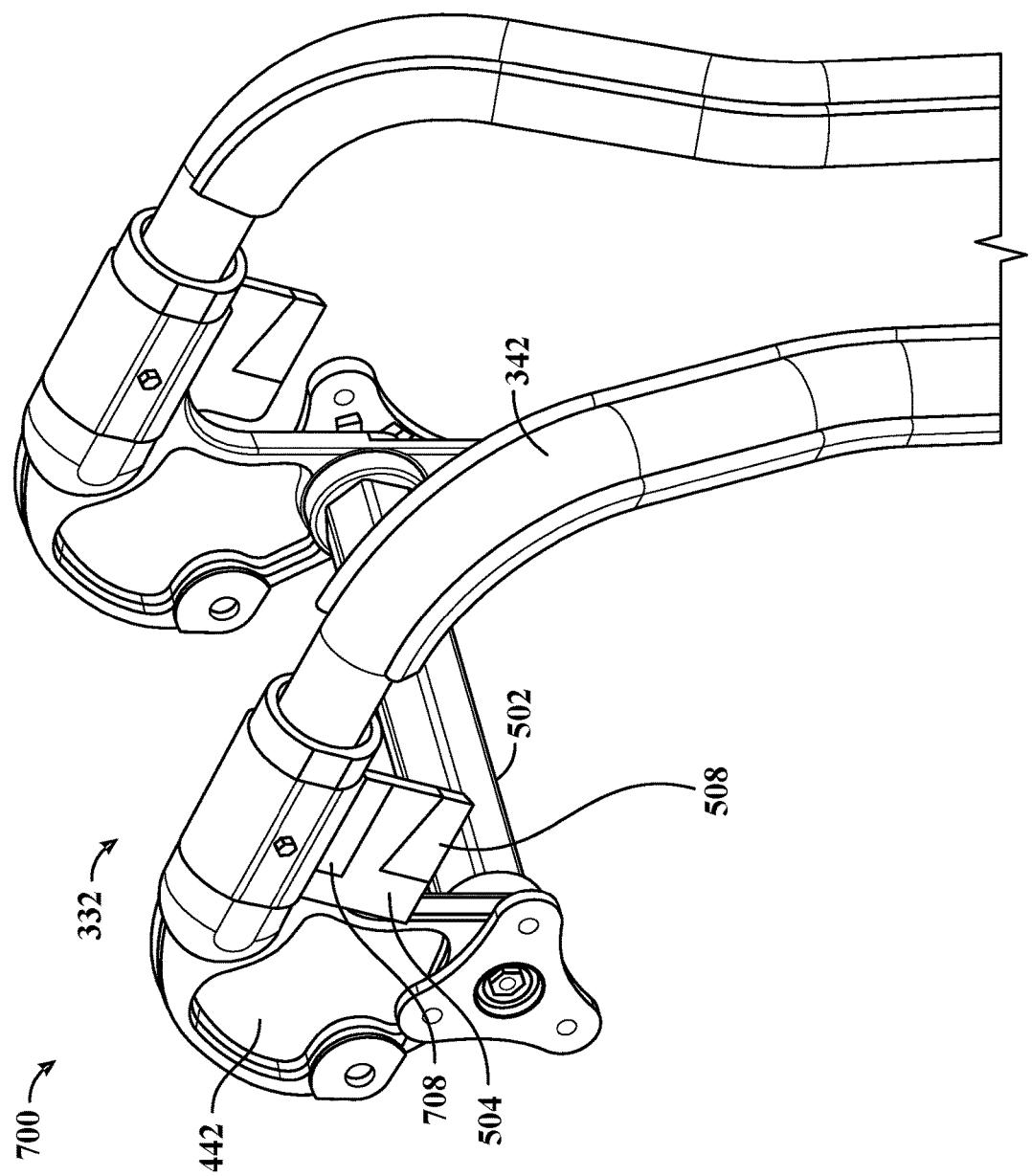
FIG. 7 is a diagram showing a perspective view of a portion of a restraint system according to another aspect of the present disclosure.

FIG. 7 is a diagram 700 showing a perspective view of a portion of a restraint system 332 according to another aspect of the present disclosure. In an aspect, in addition to the lower portion of the flap 504 being denoted by the marking 508 as described above, an upper portion of the flap 504 may also be denoted by an upper marking 708 that is visually different from the rest of the flap 504 (i.e., a central portion of the flap not occupied by the upper marking 708 or the marking 508), and in some aspects, visually different from the marking 508. For example, the upper marking 708 may be a particular color (e.g., red color) while the central portion of the flap 504 is a different color (e.g., green color). In another example, the upper marking 708 may be a pattern of various lines and/or shapes while the central portion of the flap 504 is a solid pattern, or vice versa. In an aspect, a location of the upper marking 708 and/or an amount of space occupied by the upper marking 708 on the flap 504 may be predetermined based on a maximum safe operating position/maximum closed position of the crossbar 340 for safely restraining the passenger 334 (e.g., safely preventing the passenger 334 from being ejected past the crossbar 340 by ride induced forces) when the crossbar 340 is engaged to the torso/thighs of the passenger 334. When the crossbar 340 is lowered onto the passenger 334 and the flap 504 is inserted into the slot 506, the flap 504 may indicate whether the restraint system 332/crossbar 340 is beyond the maximum closed position to safely restrain the passenger 334 according to a position of the upper marking 708 with respect to the slot 506.

For example, if any portion of the upper marking 708 is inserted in the slot 506, then the flap 504 indicates that the restraint system 332 is beyond the maximum safe operating position. The ride operator, upon seeing the visual indication that the restraint system 332 is beyond the maximum safe operating position, may quickly determine that the passenger 334 is not of a body type that may be safely accommodated in the seat 330/passenger carrier 316 (e.g., the passenger 334 is too small to safely ride) or that the restraint system 332 is not properly working, and prevent the passenger 334 from riding in the ride vehicle. Alternatively, if an entirety of the upper marking 708 is exposed outside of the slot 506 and an entirety of the marking 508 is inserted in the slot 506 (e.g., marking 508 is not visible to the ride operator), then the flap 504 indicates that the restraint system 332 is within the maximum safe operating position and has also attained minimum closure (a minimum safe operating position). The ride operator, upon seeing the visual indication that the restraint system 332 is within the maximum safe operating position and has attained minimum closure, may quickly determine that the passenger 334 is of a body type that may be safely accommodated in the seat 330/passenger carrier 316 and allow the passenger 334 to ride in the ride vehicle.

Figure 8:
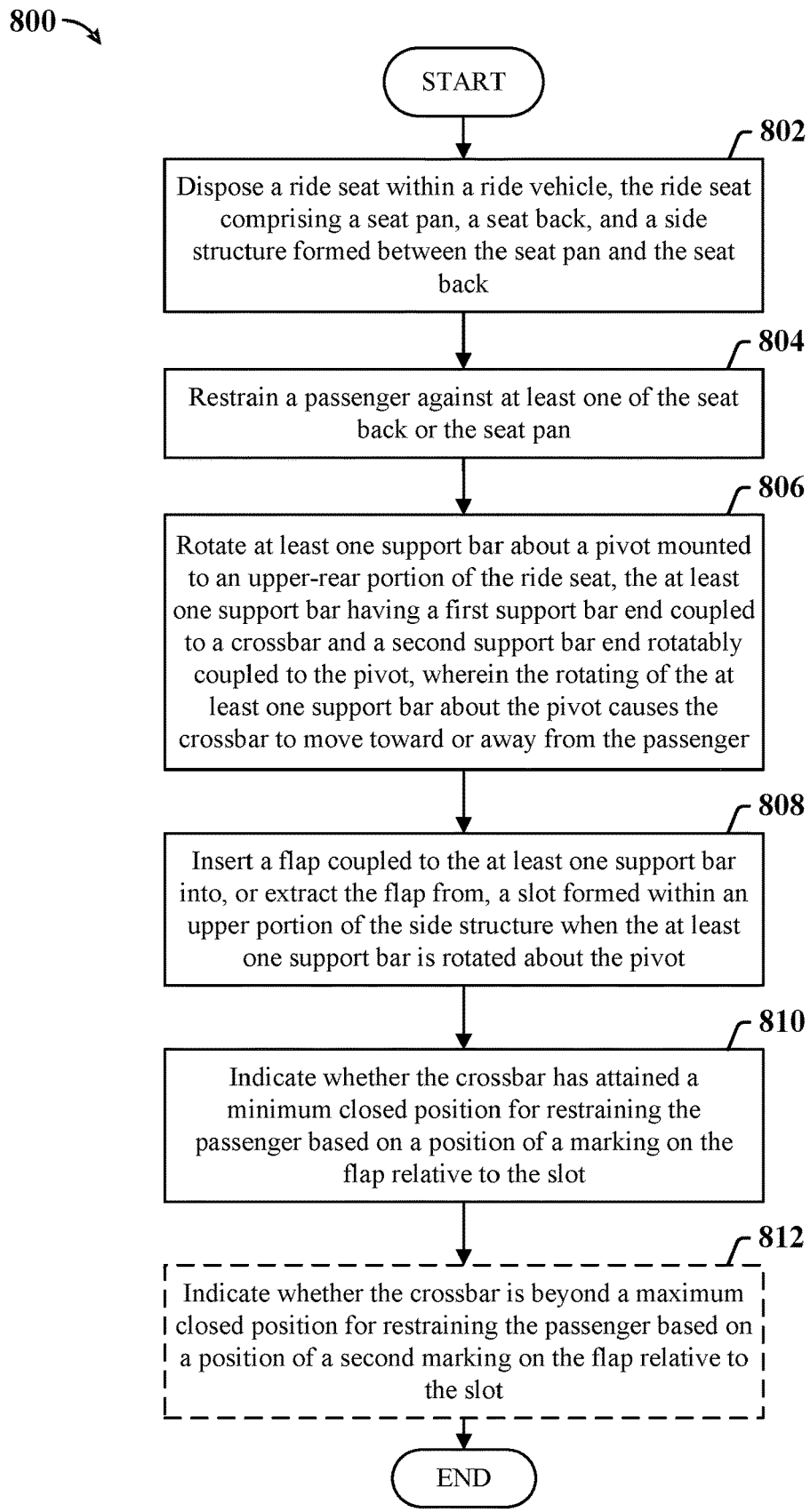
FIG. 8 is a flow chart illustrating an exemplary process for restraining a passenger in a ride vehicle according to an aspect of the present disclosure.

FIG. 8 is a flow chart illustrating an exemplary process 800 for restraining a passenger in a ride vehicle according to an aspect of the present disclosure. As described below, some or all illustrated features may be omitted in a particular implementation within the scope of the present disclosure, and some illustrated features may not be required for implementation of all embodiments. In some examples, the process 800 may be carried out by a ride system/vehicle illustrated in FIGS. 1-7. In some examples, the process 800 may be carried out by any suitable apparatus or means for carrying out the functions or algorithm described below.

At block 802, the system disposes a ride seat (e.g., ride seat 330) within a ride vehicle (e.g., ride vehicle 100). The ride seat includes a seat pan (e.g., seat pan 352), a seat back (e.g., seat back 350), and a side structure (e.g., side structure 354) formed between the seat pan and the seat back.

At block 804, the system restrains a passenger (e.g., passenger 334) against at least one of the seat back or the seat pan.

At block 806, the restraining of the passenger includes rotating at least one support bar (e.g., one or more support bars 342) about a pivot (e.g., pivot 430) mounted to an upper-rear portion of the ride seat. The at least one support bar includes a first support bar end coupled to a crossbar (e.g., crossbar 340) to be placed against the passenger and a second support bar end rotatably coupled to the pivot. The rotating of the at least one support bar about the pivot causes the crossbar to move toward (e.g., downward direction 450) or away from (e.g., upward direction 452) the passenger.

At block 808, the restraining of the passenger further includes inserting a flap (e.g., flap 504) coupled to the at least one support bar into, or extracting the flap from, a slot (e.g., slot 506) formed within an upper portion of the side structure when the at least one support bar is rotated about the pivot. In an aspect, the flap extends in a perpendicular manner relative to an orientation of the at least one support bar.

At block 810, the system indicates whether the crossbar has attained a minimum closed position for restraining the passenger based on a position of a marking (e.g., marking 508) on the flap relative to the slot. In an aspect, a location of the marking and an amount of space occupied by the marking on the flap is predetermined based on the minimum closed position of the crossbar for restraining the passenger. In another aspect, a portion of the flap occupied by the marking is visually different from a portion of the flap not occupied by the marking. For example, the portion of the flap occupied by the marking may be denoted by a color (e.g., red color) and the portion of the flap not occupied by the marking is denoted by a different color (e.g., green color). In another example, the portion of the flap occupied by the marking may be a pattern of various lines and/or shapes and the portion of the flap not occupied by the marking may be a solid pattern, or vice versa.

In an aspect, the system may indicate that the crossbar has failed to attain the minimum closed position when any portion of the marking is exposed outside of the slot. In another aspect, the system may indicate that the crossbar has attained the minimum closed position when an entirety of the marking is inserted in the slot.

At block 812, the system optionally indicates whether the crossbar is beyond a maximum closed position for restraining the passenger based on a position of a second marking (e.g., upper marking 708) on the flap relative to the slot. In an aspect, a location of the second marking and an amount of space occupied by the second marking on the flap is predetermined based on the maximum closed position of the crossbar for restraining the passenger. In another aspect, a portion of the flap occupied by the second marking is visually different from a portion of the flap not occupied by the second marking (upper marking 708) or the marking (marking 508).

In an aspect, the system may indicate that the crossbar is beyond the maximum closed position when any portion of the second marking is inserted in the slot. In another aspect, the system may indicate that the crossbar is within the maximum closed position and has attained the minimum closed position when an entirety of the second marking is exposed outside of the slot and an entirety of the marking is inserted in the slot.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object.

One or more of the components, steps, features and/or functions illustrated in FIGS. 1-8 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-8 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A system for restraining a passenger in a ride vehicle, the system comprising:
    a ride seat disposed within a ride vehicle, the ride seat comprising a seat pan, a seat back, and a side structure formed between the seat pan and the seat back; and
    a restraint system configured to restrain a passenger against at least one of the seat back or the seat pan, the restraint system comprising:
        a crossbar configured to be placed against the passenger,
        at least one support bar having a first support bar end coupled to the crossbar and a second support bar end rotatably coupled to a pivot mounted to an upper-rear portion of the ride seat, and
        a flap coupled to the at least one support bar, the flap extending in a perpendicular manner relative to an orientation of the at least one support bar, wherein the flap is configured to:

insert into, or extract from, a slot formed within an upper portion of the side structure when the at least one support bar is rotated about the pivot, and indicate whether the crossbar has attained a minimum closed position for restraining the passenger based on a position of a marking on the flap relative to the slot.

2. The system of claim 1, wherein a location of the marking and an amount of space occupied by the marking on the flap is predetermined based on the minimum closed position of the crossbar for restraining the passenger.

3. The system of claim 1, wherein the flap is configured to indicate that the crossbar has failed to attain the minimum closed position when any portion of the marking is exposed outside of the slot.

4. The system of claim 1, wherein the flap is configured to indicate that the crossbar has attained the minimum closed position when an entirety of the marking is inserted in the slot.

5. The system of claim 1, wherein a portion of the flap occupied by the marking is visually different from a portion of the flap not occupied by the marking.

6. The system of claim 5, wherein the portion of the flap occupied by the marking is denoted by a color and the portion of the flap not occupied by the marking is denoted by a different color.

7. The system of claim 1, wherein the flap is further configured to indicate whether the crossbar is beyond a maximum closed position for restraining the passenger based on a position of a second marking on the flap relative to the slot.

8. The system of claim 7, wherein a location of the second marking and an amount of space occupied by the second marking on the flap is predetermined based on the maximum closed position of the crossbar for restraining the passenger.

9. The system of claim 7, wherein the flap is configured to:
    indicate that the crossbar is beyond the maximum closed position when any portion of the second marking is inserted in the slot; and
    indicate that the crossbar is within the maximum closed position and has attained the minimum closed position when an entirety of the second marking is exposed outside of the slot and an entirety of the marking is inserted in the slot.

10. The system of claim 7, wherein a portion of the flap occupied by the second marking is visually different from a portion of the flap not occupied by the second marking or the marking.

11. The system of claim 1, wherein the restraint system further comprises:
    at least one rotation adapter coupled to the second support bar end of the at least one support bar, the at least one rotation adapter configured to rotatably couple the second support bar end to the pivot; and
    at least one hydraulic cylinder coupled to the at least one rotation adapter, the at least one hydraulic cylinder configured to actuate the at least one rotation adapter to rotate the at least one support bar about the pivot causing the crossbar to move toward or away from the passenger.

12. A method for restraining a passenger in a ride vehicle, the method comprising:
    disposing a ride seat within a ride vehicle, the ride seat comprising a seat pan, a seat back, and a side structure formed between the seat pan and the seat back; and
    restraining a passenger against at least one of the seat back or the seat pan, the restraining comprising:
        rotating at least one support bar about a pivot mounted to an upper-rear portion of the ride seat, the at least one support bar having a first support bar end coupled to a crossbar to be placed against the passenger and a second support bar end rotatably coupled to the pivot, wherein the rotating of the at least one support bar about the pivot causes the crossbar to move toward or away from the passenger, and
        inserting a flap coupled to the at least one support bar into, or extracting the flap from, a slot formed within an upper portion of the side structure when the at least one support bar is rotated about the pivot; and
    indicating whether the crossbar has attained a minimum closed position for restraining the passenger based on a position of a marking on the flap relative to the slot.

13. The method of claim 12, wherein the flap extends in a perpendicular manner relative to an orientation of the at least one support bar.

14. The method of claim 12, wherein a location of the marking and an amount of space occupied by the marking on the flap is predetermined based on the minimum closed position of the crossbar for restraining the passenger.

15. The method of claim 12, wherein the indicating comprises indicating that the crossbar has failed to attain the minimum closed position when any portion of the marking is exposed outside of the slot.

16. The method of claim 12, wherein the indicating comprises indicating that the crossbar has attained the minimum closed position when an entirety of the marking is inserted in the slot.

17. The method of claim 12, wherein a portion of the flap occupied by the marking is visually different from a portion of the flap not occupied by the marking.

18. The method of claim 12, further comprising indicating whether the crossbar is beyond a maximum closed position for restraining the passenger based on a position of a second marking on the flap relative to the slot.

19. The method of claim 18, wherein a location of the second marking and an amount of space occupied by the second marking on the flap is predetermined based on the maximum closed position of the crossbar for restraining the passenger.

20. The method of claim 18, wherein the indicating comprises:
    indicating that the crossbar is beyond the maximum closed position when any portion of the second marking is inserted in the slot; and
    indicating that the crossbar is within the maximum closed position and has attained the minimum closed position when an entirety of the second marking is exposed outside of the slot and an entirety of the marking is inserted in the slot.

* * * * *